United States Patent
Kirkland

(10) Patent No.: US 9,919,588 B1
(45) Date of Patent: Mar. 20, 2018

(54) DOOR STRAP SYSTEM

(71) Applicant: Victor Kirkland, Rock Hill, SC (US)

(72) Inventor: Victor Kirkland, Rock Hill, SC (US)

( * ) Notice: Subject to any disclaimer, the term of this patent is extended or adjusted under 35 U.S.C. 154(b) by 0 days.

(21) Appl. No.: 15/380,099

(22) Filed: Dec. 15, 2016

(51) Int. Cl.
*B60J 5/10* (2006.01)
*B60J 5/14* (2006.01)
*B62D 33/04* (2006.01)

(52) U.S. Cl.
CPC ............... *B60J 5/108* (2013.01); *B60J 5/14* (2013.01); *B62D 33/04* (2013.01); *E05Y 2900/516* (2013.01)

(58) Field of Classification Search
CPC .. B60P 7/0823; B60P 7/807; B60J 5/14; B60J 5/108; Y10T 16/458; E05Y 2900/516; E05Y 2900/532; E05Y 2900/546; B62D 33/04
See application file for complete search history.

(56) References Cited

U.S. PATENT DOCUMENTS

| D289,698 | S | 5/1987 | Bates | |
|---|---|---|---|---|
| 4,862,554 | A | 9/1989 | Chojnacki | |
| 5,800,106 | A | 9/1998 | Miller | |
| 8,726,467 | B1 | 5/2014 | Smith | |
| 9,221,381 | B1 * | 12/2015 | Flud | B60P 7/0807 |
| 2006/0177282 | A1 | 8/2006 | Blosser | |
| 2009/0013497 | A1 | 1/2009 | Squyres et al. | |
| 2016/0221423 | A1 * | 8/2016 | Barton | E05F 11/54 |

FOREIGN PATENT DOCUMENTS

WO    WO2013064149    5/2013

\* cited by examiner

*Primary Examiner* — Justin B Rephann

(57) ABSTRACT

A door strap system includes a trailer that may contain cargo. The trailer has an outer wall and a rear side and the rear side is open to access an interior of the trailer. A door is slidably coupled to the trailer and the door is positionable between an open position and a closed position. A lift truck is selectively driven through the rear side of the trailer when the lift truck loads and unloads the trailer. A strap is coupled to the door thereby facilitating the door to be pulled downwardly into the closed position. A retention unit is coupled to the strap and the retention unit selectively engages the outer wall of the trailer such that the lift truck is inhibited from contacting the strap when the lift truck is driven through the rear side.

4 Claims, 3 Drawing Sheets

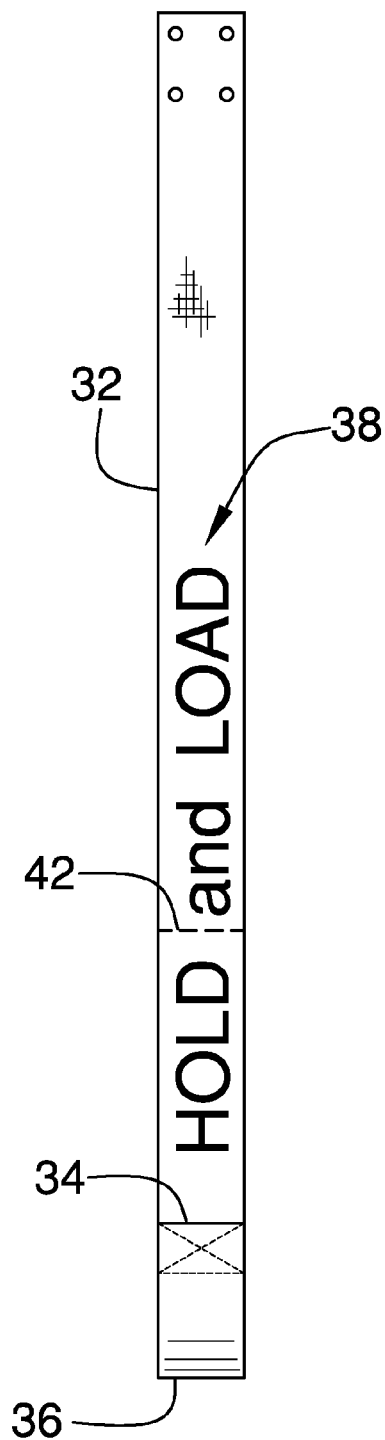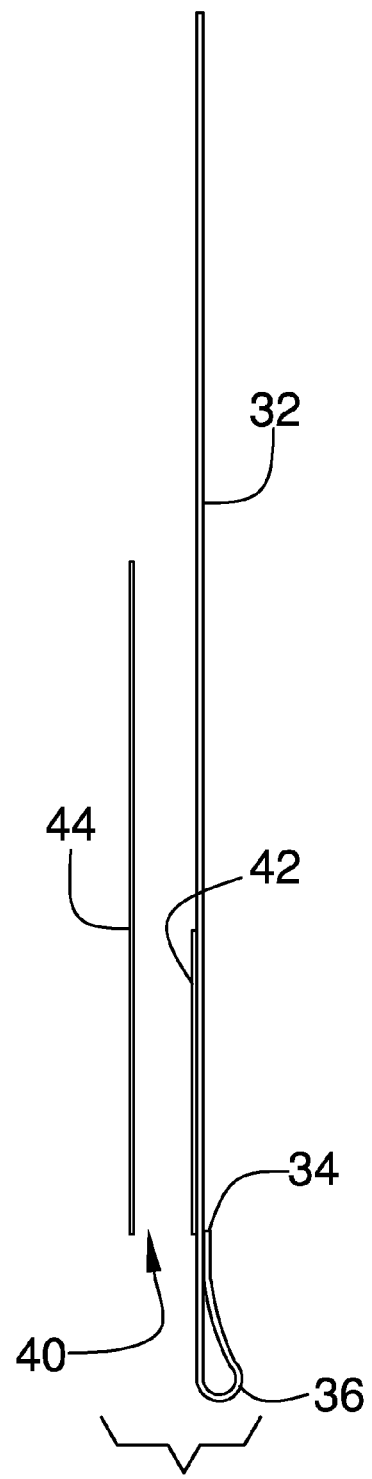

DOOR STRAP SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to strap devices and more particularly pertains to a new strap device for inhibiting a lift truck from damaging a trailer door.

BRIEF SUMMARY OF THE INVENTION

An embodiment of the disclosure meets the needs presented above by generally comprising a trailer that may contain cargo. The trailer has an outer wall and a rear side and the rear side is open to access an interior of the trailer. A door is slidably coupled to the trailer and the door is positionable between an open position and a closed position. A lift truck is selectively driven through the rear side of the trailer when the lift truck loads and unloads the trailer. A strap is coupled to the door thereby facilitating the door to be pulled downwardly into the closed position. A retention unit is coupled to the strap and the retention unit selectively engages the outer wall of the trailer such that the lift truck is inhibited from contacting the strap when the lift truck is driven through the rear side.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is a front view of a strap of a door strap system according to an embodiment of the disclosure.

FIG. 2 is a right side view of a strap and a second mating member of an embodiment of the disclosure.

DETAILED DESCRIPTION OF THE INVENTION

Figure 3:
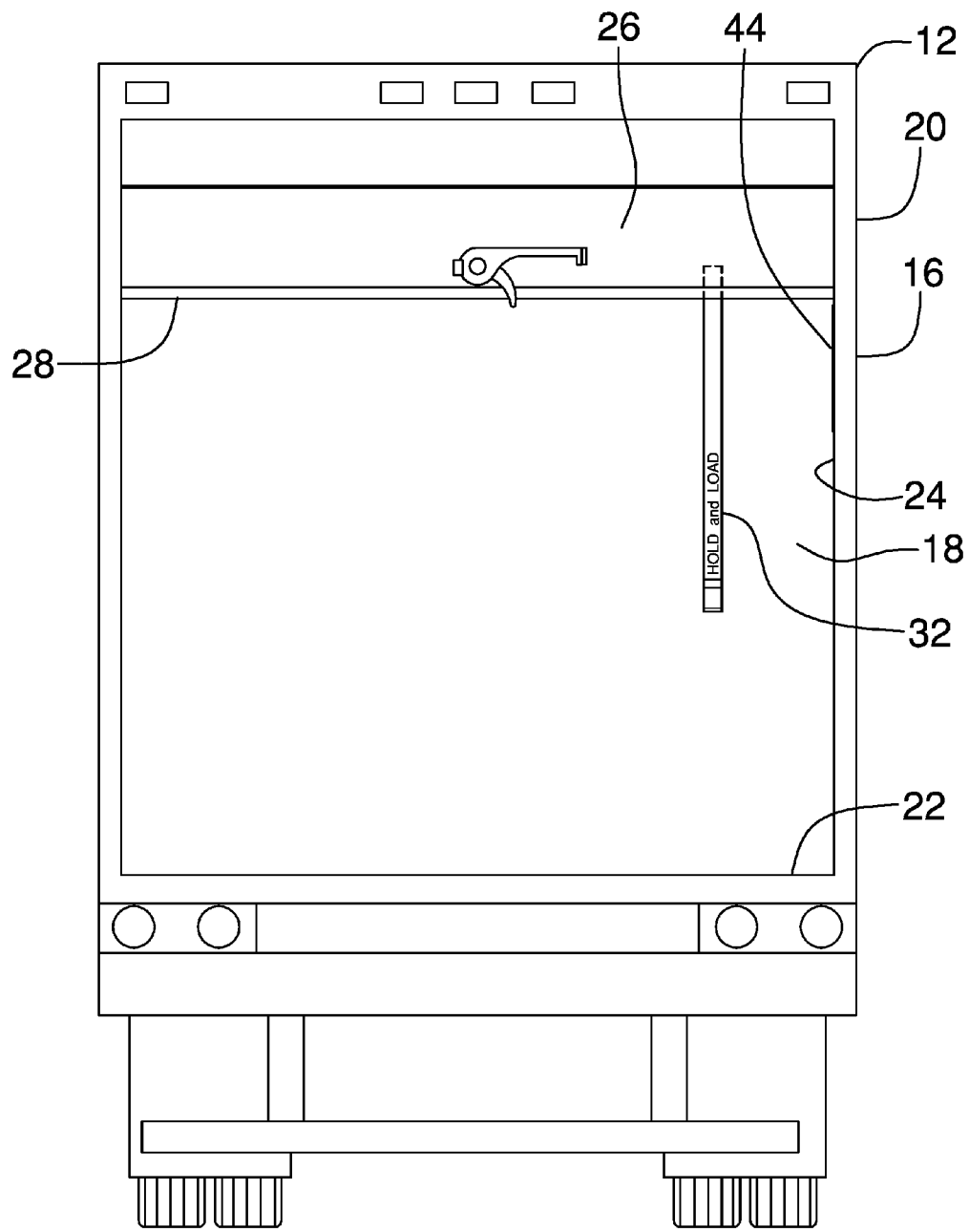
FIG. 3 is a perspective in-use view of an embodiment of the disclosure.
Figure 4:
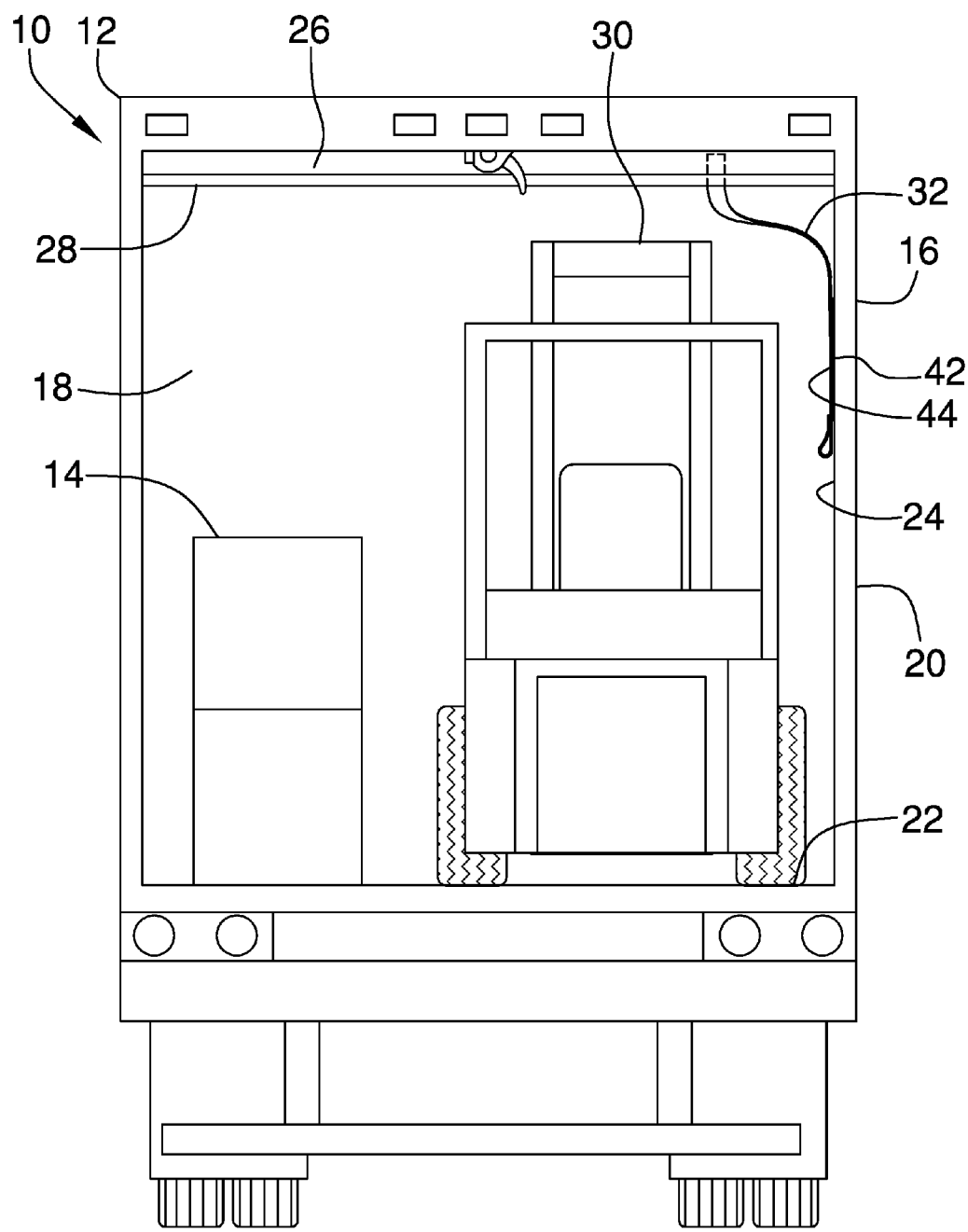
FIG. 4 is a rear perspective in-use view of an embodiment of the disclosure.

With reference now to the drawings, and in particular to FIGS. 1 through 4 thereof, a new strap device embodying the principles and concepts of an embodiment of the disclosure and generally designated by the reference numeral 10 will be described.

As best illustrated in FIGS. 1 through 4, the door strap system 10 generally comprises a trailer 12 that may contain cargo 14. The trailer 12 has an outer wall 16 and a rear side 18 and the rear side 18 is open to access an interior of the trailer 12. The outer wall 16 has a first lateral side 20, a lower side 22 and an inner surface 24. Moreover, the trailer 12 may be a semi trailer 12 or other enclosed trailer 12.

A door 26 is slidably coupled to the trailer 12 and the door 26 is positionable between an open position and a closed position. The door 26 is vertically slidable on the trailer 12 and the door 26 has a lower edge 28. The lower edge 28 is spaced from the lower side 22 of the trailer 12 when the door 26 is in the open position.

A lift truck 30 is selectively driven through the rear side 18 of the trailer 12 when the lift truck 30 loads and unloads the trailer 12. The lift truck 30 may be a motorized forklift, a walk-behind forklift or any other machine used to move the cargo 14 on and off the trailer 12. A strap 32 is coupled to the door 26 to facilitate the door 26 to be pulled downwardly into the closed position. The strap 32 has a distal end 34 with respect to the lower edge 28 of the door 26 and the distal end 34 is folded onto the strap 32 to define a closed loop 36.

Indicia 38 are printed on the strap 32 and the indicia 38 comprise words. The words may be "HOLD and LOAD". A retention unit 40 is provided and the retention unit 40 is coupled to the strap 32. The retention unit 40 engages the outer wall 16 of the trailer 12. Thus, the strap 32 is held out of the way of the lift truck 30. In this way the lift truck 30 is inhibited from contacting the strap 32 when the lift truck 30 is driven through the rear side 18.

The retention unit 40 comprises a first mating member 42 that is coupled to the strap 32. The first mating member 42 may be a magnet or the like. A second mating member 44 is coupled to the outer wall 16 of the trailer 12. The second mating member 44 may be a magnet or the like and the first mating member 42 selectively engages the second mating member 44. The second mating member 44 is positioned on the inner surface 24 corresponding to the first lateral side 20 and the second mating member 44 is aligned with the rear side 18 of the trailer 12.

In use, the door 26 is positioned in the open position to facilitate the trailer 12 to be loaded and unloaded. The strap 32 is manipulated to position the first mating member 42 on the second mating member 44 to retain the strap 32 out of the way of the lift truck 30. Thus, the lift truck 30 is inhibited from catching the strap 32 and potentially urging the door 26 to contact the lift truck 30. In this way the retention unit 40 inhibits the door 26 from being damaged by the lift truck 30. The closed loop 36 is selectively grasped and the strap 32 is pulled downwardly to slide the door 26 into the closed position.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A door strap system comprising:
    a trailer being configured to contain cargo, said trailer having an outer wall and a rear side, said rear side being open to access an interior of said trailer;
    a door being slidably coupled to said trailer such that said door is positionable between an open position and a closed position;
    a strap, said strap having a first end being coupled to said door, said strap having a distal end relative to said door, said distal end of said strap being free wherein said strap is configured to hang downwardly from said door to be gripped thereby facilitating said door to be pulled downwardly into said closed position; and
    a retention unit, said retention unit having a first mating member coupled to said strap, said first mating member extending flat along a surface of said strap, said retention unit having a second mating member being coupled to said trailer, said second mating member extending flat along said outer wall adjacent to said rear side, said first mating member being engageable to said second mating member wherein said strap is coupled flat against said outer wall such that said strap is inhibited from obstructing said open rear side of said trailer.

2. The system according to claim 1, wherein:
    said outer wall has a first lateral side, a lower side and an inner surface; and
    said door is vertically slidable on said trailer, said door having a lower edge, said lower edge being spaced from said lower side of said trailer when said door is in said open position.

3. The system according to claim 2, wherein said strap is folded to define a closed loop on said strap at said distal end relative to said door.

4. A door strap system comprising:
    a trailer being configured to contain cargo, said trailer having an outer wall and a rear side, said rear side being open to access an interior of said trailer, said outer wall having a first lateral side, a lower side and an inner surface;
    a door being slidably coupled to said trailer such that said door is positionable between an open position and a closed position, said door being vertically slidable on said trailer, said door having a lower edge, said lower edge being spaced from said lower side of said trailer when said door is in said open position;
    a strap, said strap having a first end being coupled to said door, said strap having a distal end relative to said door, said distal end of said strap being free wherein said strap is configured to hang downwardly from said door to be gripped thereby facilitating said door to be pulled downwardly into said closed position, said strap being folded to define a closed loop on said strap at said distal end relative to said door; and
    a retention unit, said retention unit having a first mating member coupled to said strap, said first mating member extending flat along a surface of said strap, said retention unit having a second mating member being coupled to said trailer, said second mating member extending flat along said outer wall adjacent to said rear side, said first mating member being engageable to said second mating member wherein said strap is coupled flat against said outer wall such that said strap is inhibited from obstructing said open rear side of said trailer.

* * * * *